US 6,528,132 B1

United States Patent
Naerheim

(10) Patent No.: US 6,528,132 B1
(45) Date of Patent: Mar. 4, 2003

(54) PHASE CHANGE COOLING OF BRAKE COMPONENTS

(75) Inventor: Yngve Naerheim, Thousand Oaks, CA (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/510,689

(22) Filed: Feb. 23, 2000

(51) Int. Cl.[7] ................................................. B60T 5/00
(52) U.S. Cl. ................ 428/34.1; 428/313.3; 428/313.9; 428/317.9; 188/264 C; 188/264 D; 188/264 F
(58) Field of Search ........................... 428/313.3, 313.9, 428/317.9; 188/264 F, 264 C, 264 D

(56) References Cited

U.S. PATENT DOCUMENTS 5,139,118 A  8/1992  Schenk .................. 188/264 CC

FOREIGN PATENT DOCUMENTS

| GB | 363809 | | 12/1931 | |
| GB | 1325646 | * | 8/1973 | ............ F16D/65/84 |
| GB | 2088503 | * | 12/1980 | ............ F16D/65/78 |
| GB | 2088503 | | 6/1982 | ............ F16D/65/78 |

* cited by examiner

Primary Examiner—Mark L. Bell
Assistant Examiner—Shalie Manlove
(74) Attorney, Agent, or Firm—Carlson, Gaskey & Olds

(57) ABSTRACT

A cooling device for a brake component is provided. The brake component includes a structural element that has an interior cavity. A cooling material is disposed within the cavity. The material has a phase change temperature at a particular pressure and volume. The material absorbs the heat generated by the structural element by changing from a first state to a second state at the phase change temperature to maintain the brake component or structural element below the maximum operating temperature. The phase change temperature may be defined by a melting point of the material in which the first state is solid and the second state is liquid, or by an evaporation point of the material in which the first state is liquid and the second state is gas.

14 Claims, 1 Drawing Sheet

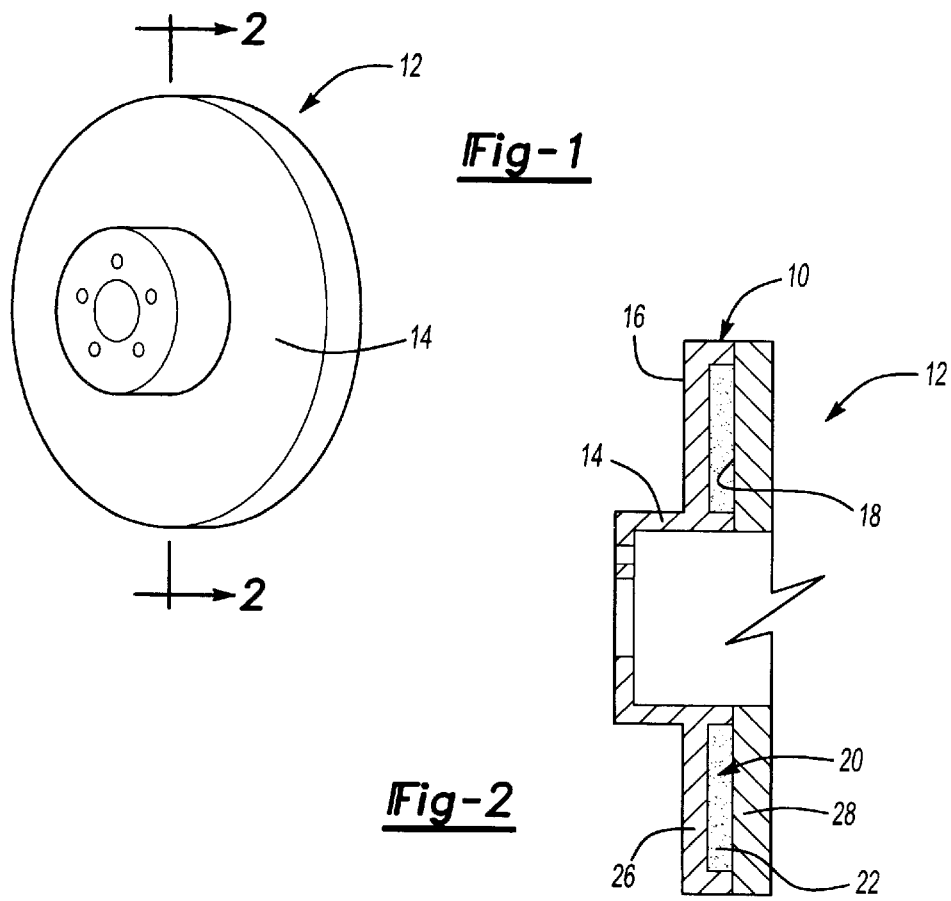
*Fig-1*
*Fig-2*
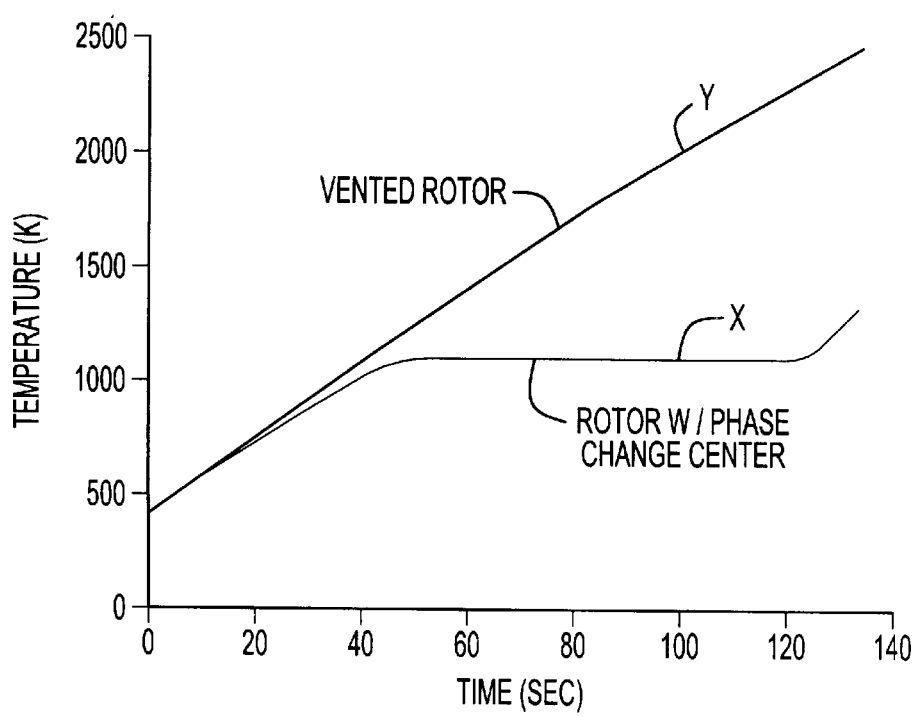
*Fig-3*

PHASE CHANGE COOLING OF BRAKE COMPONENTS

BACKGROUND OF THE INVENTION

This invention relates to brake components, and more specifically, the invention relates to an apparatus and method of cooling brake components.

Modern vehicles are required to stop in shorter distances than previously necessary to improve vehicle performance and handling. Braking components, such as brake rotors and drums, calipers, and brake pads, have experienced higher operating temperatures as the demand for shorter stopping distances has increased. As the temperature of the brake component exceeds its thermal capacity, the performance of the component may be compromised and the stopping distance increased. For example, the rate of wear may increase or the brakes may "fade" and become virtually inoperative due to the higher temperatures.

The problem of higher temperatures is exacerbated by the tighter packaging of modern vehicles. The size of brake components has been reduced to decrease weight and cost, which has reduced the thermal capacity of the affected brake component. Brake components, such as rotors, have utilized ribs or vents to increase the surface area to increase heat dissipation and cooling of the rotor. However, tighter packaging has adversely affected airflow through the brake components, which has reduced the cooling effects of convection around the brake components. As a result, the ribs on a rotor are less effective at dissipating heat. Therefore, what is needed is an apparatus and method for effectively cooling smaller modern brake components in the tighter spaces found in modern vehicles.

SUMMARY OF THE INVENTION AND ADVANTAGES

The present invention provides a cooling device for a brake component. The brake component includes a structural element that has an interior cavity. A cooling material is disposed within the cavity. The material has a phase change temperature at a particular pressure and volume. The material absorbs the heat generated by the structural element by changing from a first state to a second state at the phase change temperature to maintain the brake component or structural element below the maximum operating temperature. The phase change temperature may be defined by a melting point of the material in which the first state is solid and the second state is liquid, or by an evaporation point of the material in which the first state is liquid and the second state is gas.

Accordingly, the above invention provides an apparatus and method for effectively cooling smaller modern brake components in the tighter spaces found in modern vehicles

BRIEF DESCRIPTION OF THE DRAWINGS

Other advantages of the present invention can be understood by reference to the following detailed description when considered in connection with the accompanying drawings wherein:

FIG. 1 is a perspective view of a brake rotor of the present invention;

FIG. 2 is a cross-sectional view of the brake rotor of FIG. 1 taken along line 2—2; and FIG. 3 is a graph illustrating the temperature over time of a brake rotor of the resent invention compared to a prior art brake rotor.

DETAILED DESCRIPTION OF THE PREFERRED EMBODIMENT

A cooling device 10 for a brake component 12 is shown in FIGS. 1 and 2. The brake component 12 shown is a brake rotor, however, it is to be understood that the brake component may be a brake drum, caliper, brake pads, or any component subjected to high operating temperatures which inhibit the performance of the component. The present invention is also applicable to such components as wet disc brakes, which may provide the ability to eliminate cooling oil previously used. The brake component 12 has a maximum operating temperature, above which its performance deteriorates to an unacceptable level. The brake component 12 includes a structural element 14 defined by an outer surface 16 and an inner surface 18 spaced from the outer surface 16. In the embodiment depicted in the Figures, the structural element 14 is the body of the brake rotor. However, for a brake pad incorporating the present invention, the structural element 14 may be the backing plate to which the frictional pads are secured.

The inner surface 18 defines a cavity 20. During use of the brake component 12, the structural element 14 produces a heat. A cooling material 22 is disposed within the cavity 20 to absorb the heat. The structural element 14 includes first 26 and second 28 portions secured to one another to form the cavity 20 and seal the cavity 20 to retain the material 22. This may be achieved by using two separate halves, as shown in FIG. 2, secured by fastening element or in any other suitable manner. Alternatively, the cavity 20 may be formed by machining or casting the cavity 20 into the structural element 14 and inserting a plug, or the like, to seal the cavity 20 and retain the material 22 therein.

The material 22 has a phase change temperature at a particular pressure and volume. The material 22 absorbs the heat generated by the structural element 14 by changing from a first state to a second state at the phase change temperature to maintain the brake component 12 or structural element 14 below the maximum operating temperature. The phase change temperature may be defined by a melting point of the material 22 in which the first state is solid and the second state is liquid, or by an evaporation point of the material 22 in which the first state is liquid and the second state is gas.

Referring to FIG. 3, the temperature of a brake rotor over time is depicted with the present invention, indicated by curve X, and without the present invention, indicated by curve Y. The material 22 selected has a phase change temperature of approximately 1000° K. When the temperature of the material 22 reaches 1000° K. from the heat generated by the structural element 14, the material 22 changes physical states from a first state to a second state. During the physical state change which is an endothermic process, the material 22 absorbs much more heat than in the first state. The temperature of the rotor, or structural element 14, corresponds to the phase change properties of the material 22. As shown in FIG. 3, the material 22 is in the first state during the first 40 seconds. From 40 seconds to 120 seconds, the material 22 absorbs energy in the form of heat from the structural element 14 to change from the first state to the second state. After 120 seconds, the material 22 makes the transition from the first state to the second state. Once the temperature of the material 22 drops below the phase change temperature, the material 22 will return to the first state. Heat is dissipated to the surrounding environment between brake applications by conventional cooling when the material 22 returns to the first state.

The requirements of a particular brake component 12 are dependent upon the type of component and the application or performance requirements. The maximum operating temperature for the brake component 12 must be determined. A material 22 preferably should be selected that has a phase change temperature below the maximum operating temperature of the brake component 12 or structural element 14. Suitable materials may include tin, zinc, aluminum, or alloys containing them. Another suitable material may include a salt substance. Virtually any material may be used that has the desired phase change temperature for the particular application.

If the first state of the material 22 is solid, the material 22 may be inserted into the cavity 20 by pouring it in a molten state into the cavity 20 and letting it solidify. Alternatively, the material 22 may be inserted into the cavity 20 in a powdered form, or in any other suitable form. The cavity 20 is preferably sealed to prevent the material 22 from escaping the structural element 14 after it has changed to the second state.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A cooling device for a brake component with a predetermined maximum operating temperature comprising:
   a structural element defined by a first and second lateral portion secured to one another and respectively including an outer surface and an inner surface spaced from said outer surface with said first and second lateral portions defining a cavity, said structural element producing a heat; and
   a material comprising zinc disposed in said cavity having a phase change temperature at a pressure and a volume, said material absorbing said heat by changing from a first state to a second state at said phase change temperature to maintain said structural element below said predetermined maximum operating temperature.

2. The cooling device according to claim 1, wherein said structural element is a brake rotor.

3. The cooling device according to claim 1, wherein said phase change temperature is defined by a melting point of said material with said first state being solid and said second state being liquid.

4. The cooling device according to claim 3, wherein said material is poured into said cavity when in said liquid state to form said cooling device.

5. The cooling device according to claim 1, wherein said phase change temperature is defined by an evaporation point of said material with said first state being liquid and said second state being gas.

6. A cooling device for a brake component with a predetermined maximum operating temperature comprising:
   a structural element defined by a first and second lateral portion secured to one another and respectively including an outer surface and an inner surface spaced from said outer surface with said first and second lateral portions defining a cavity, said structural element producing a heat; and
   a material comprising aluminum disposed in said cavity having a phase change temperature at a pressure and a volume, said material absorbing said heat by changing from a first state to a second state at said phase change temperature to maintain said structural element below said predetermined maximum operating temperature.

7. A cooling device for a brake component with a predetermined maximum operating temperature comprising:
   a structural element defined by a first and second lateral portion secured to one another and respectively including an outer surface and an inner surface spaced from said outer surface with said first and second lateral portions defining a cavity, said structural element producing a heat; and
   a material comprising salt disposed in said cavity having a phase change temperature at a pressure and a volume, said material absorbing said heat by changing from a first state to a second state at said phase change temperature to maintain said structural element below said predetermined maximum operating temperature.

8. A cooling device for a brake component with a predetermined maximum operating temperature comprising:
   a brake rotor defined by a first and second lateral portion secured to one another and respectively including an outer surface and an inner surface spaced from said outer surface with said first and second lateral portions defining a cavity, said structural element producing a heat; and
   a material comprising tin disposed in said cavity having a phase change temperature at a pressure and a volume, said material absorbing said heat by changing from a first state to a second state at said phase change temperature to maintain said structural element below said predetermined maximum operating temperature.

9. The cooling device according to claim 6, wherein said structural member is a brake rotor.

10. The cooling device according to claim 7, wherein said structural member is a brake rotor.

11. The cooling device according to claim 6, wherein said phase change temperature is defined by a melting point of said material with said first state being solid and said second state being liquid.

12. The cooling device according to claim 7, wherein said phase change temperature is defined by a melting point of said material with said first state being solid and said second state being liquid.

13. The cooling device according to claim 6, wherein said phase change temperature is defined by an evaporation point of said material with said first state being liquid and said second state being gas.

14. The cooling device according to claim 7, wherein said phase change temperature is defined by an evaporation point of said material with said first state being liquid and said second state being gas.

* * * * *

UNITED STATES PATENT AND TRADEMARK OFFICE
CERTIFICATE OF CORRECTION

PATENT NO.   : 6,528,132 B1
DATED        : March 4, 2003
INVENTOR(S)  : Yngve Naerheim It is certified that error appears in the above-identified patent and that said Letters Patent is hereby corrected as shown below:

<u>Column 4,</u>
Line 29, "brake rotor" should be -- structural element --.

Signed and Sealed this

Sixteenth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,528,132 B1
DATED         : March 4, 2003
INVENTOR(S)   : Naerheim It is certified that error appears in the above-identified patent and that said Letters Patent is hereby corrected as shown below:

Column 4,
Lines 31 and 37, "said structural element" should be -- said brake rotor --

Signed and Sealed this

Fourth Day of May, 2004

JON W. DUDAS
*Acting Director of the United States Patent and Trademark Office*